May 5, 1959  J. K. WILLIS  2,884,803
FORCE APPLYING LEVER AND LINKAGE SYSTEM
Filed Sept. 26, 1956  2 Sheets-Sheet 1

INVENTOR.
JACK K. WILLIS
BY
D. C. Staley
ATTORNEY

May 5, 1959  J. K. WILLIS  2,884,803
FORCE APPLYING LEVER AND LINKAGE SYSTEM
Filed Sept. 26, 1956  2 Sheets-Sheet 2

INVENTOR.
JACK K. WILLIS
BY
D. C. Staley
ATTORNEY

United States Patent Office 2,884,803
Patented May 5, 1959

2,884,803

FORCE APPLYING LEVER AND LINKAGE SYSTEM

Jack K. Willis, San Francisco, Calif., assignor to General Motors Corporation, Detroit, Mich., a corporation of Delaware Application September 26, 1956, Serial No. 612,263

7 Claims. (Cl. 74—512)

This invention relates to a force applying system, and particularly to a lever system for applying the brakes of a motor vehicle.

It has become desirable of recent years to shorten the stroke of movement of a brake pedal that is normally used for applying the brakes of a motor vehicle so that the brakes can be applied more quickly and the shorter stroke of movement of the pedal will allow the brake pedal to be placed more on a plane with the accelerator pedal for the motor vehicle so that the operator can shift a foot quickly from the accelerator to the brake pedal, thereby cutting down reaction time between acceleration and braking.

In the brake system of the average motor vehicle there is a certain amount of lost motion that occurs in moving the brake assemblies into frictional engagement with the brake drum with the result that a part of the brake pedal movement is used up in merely taking up the normal slack in the brake system.

It is an object of this invention to provide a lever system for applying the brakes of a vehicle wherein the lever system effects a rapid movement of the brake assemblies into frictional engagement with the brake drum on a relatively short stroke of the brake pedal and at a ratio of mechanical advantage that is lower than is desired for high pressure brake application so that a soft pedal action is provided during the initial movement of the brake pedal.

It is also an object of the invention to provide a brake applying lever system that accomplishes the foregoing object and wherein the mechanical advantage for effecting high pressure application of the brakes is increased during the time the brake assemblies are being moved into engagement with the brake drums so that when the assemblies engage the brake drums there will be provided a high mechanical advantage to secure a high pressure brake application with a low power requirement on the part of the operator of the vehicle.

Further objects and advantages of the present invention will be apparent from the following description, reference being had to the accompanying drawings wherein a preferred form of the invention is clearly shown.

Figure 1:
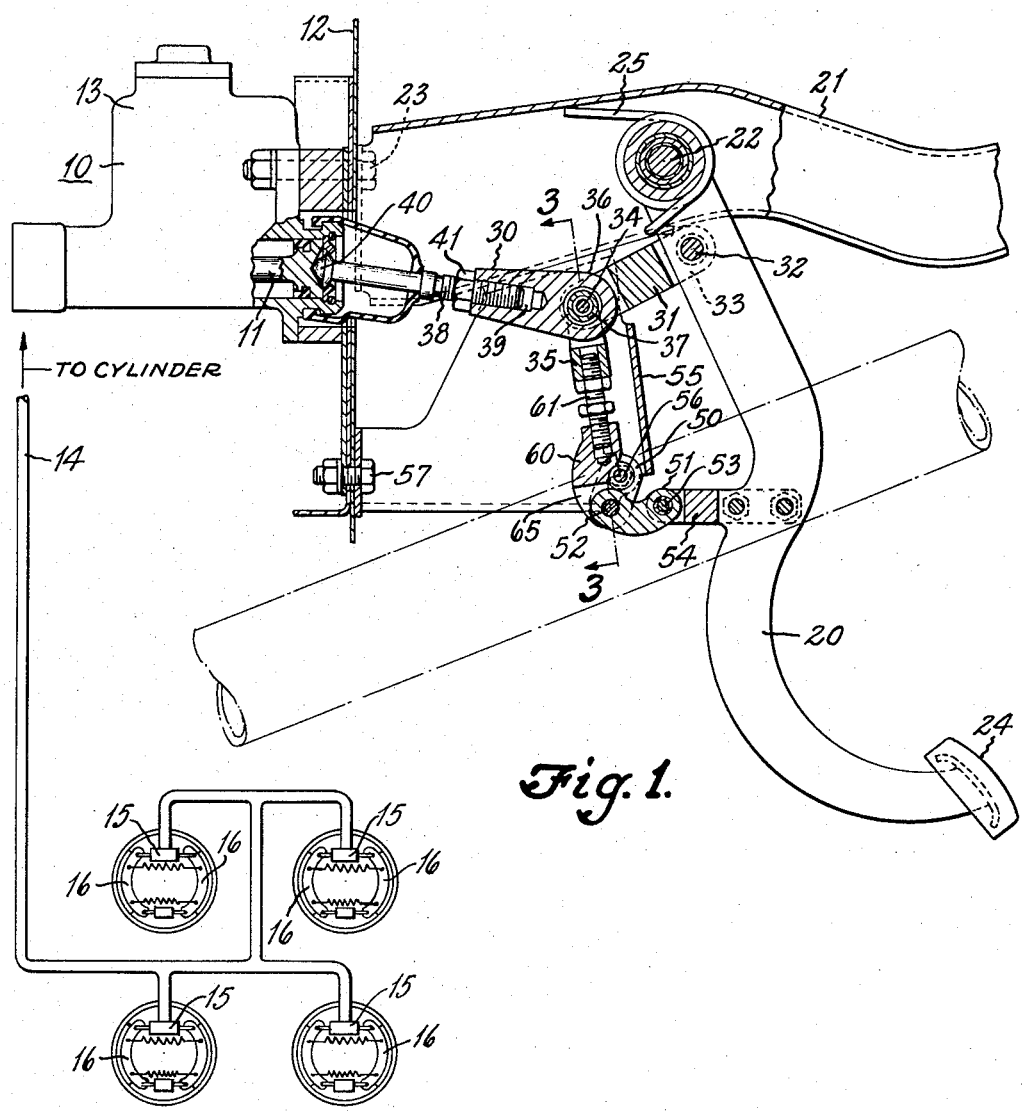
Figure 1 is a side view partially in elevation and partialy in cross section of a lever system for applying brakes constructed in accordance with this invention, the lever system being shown in the normal brake release position.

In this invention a master cylinder 10 that has a fluid displacement member 11 therein is mounted on the forward wall 12 of the passenger compartment of a motor vehicle. The master cylinder 10 includes a reservoir 13 for maintaining supply of hydraulic fluid in the hydraulic brake system. The fluid displacement member 11 discharges hydraulic fluid under pressure through a conventional residual pressure valve (not shown) into the hydraulic brake line 14 that supplies hydraulic fluid to the wheel cylinders 15 of the several wheel brakes 16 that may be of any conventional design of hydraulic brake.

The brake pedal consisting of a lever 20 is pivotally mounted on a bracket 21 by means of a pivot pin 22. The bracket 21 is suitably secured to the forward wall 12 by means of bolts 23 that may also secure the master cylinder 10 to the wall 12. The lower end of the brake lever 20 carries a foot pad 24. A torsion spring 25 having one end engaging the bracket 21 and the opposite end wrapped around the lever 20 normally positions the pedal lever 20 in the position shown in Figure 1, the brakes under this condition being in their retracted position.

The pedal lever 20 is connected with the fluid displacement member 11 to which the brake applying force is applied by means of a pair of links 30 and 31, the link 30 forming a force applying member and the link 31 providing a means for connecting the force applying member 30 with the pedal lever 20. The link 31 is pivotally carried on the pedal lever 20 by a pivot pin 32, the opposite end of the link 31 forming a yoke 33, as more specifically shown in Figure 3. The yoke 33 is carried on a pivot pin 34 that is supported by a yoke 35 that forms a part of a link connected with another linkage mechanism for operating the links 30 and 31 in a manner hereinafter described. The yoke 35 supports the pivot pin 34 with the yoke 33 positioned internally of the yoke 35 and the end 36 of the link 30 is carried on the sleeve 37 that is also carried on the pivot pin 34. Thus the pivot pin 34 and the sleeve 37 forms a knee of a joint of which the links 30 and 31 are the component elements.

The link 30 carries a stud 38 threadably received in the bore 39 of the link 30 for adjusting the length of the link 30 between the axis of the pivot pin 34 and the engagement of the head 40 of the stud 38 with the fluid displacement member 11. A jamb nut 41 secures the stud in adjusted position.

The toggle joint 30—31 is connected to a second joint consisting of the links 50 and 51 that are connected together with a pivot pin 52 forming the knee of the toggle joint. The link 51 is connected to the pedal arm 20 by means of a pivot pin 53 that projects through the extension 54 on the lever 20. The link 50 is supported on a bracket 55 by means of a pivot pin 56, the pin 56 being fixedly secured so that the knee pivot 52 will rotate about the fixed pivot 56 when the pivot 53 is moved in a left or right hand direction as viewed in Figure 1. The bracket 55 is secured to the wall 12 by means of a bolt 57.

The knee pivot 52 of the knee joint 50—51 carries a link 60 that connects with the yoke 35 by means of a threaded stud 61 that provides adjustment for the length of the connecting link 35, 61, 60 between the axis of the knee pivot 34 and the knee pivot 52.

It will be noted that the connection of the link 51 of the toggle 50—51 is more remote from the pivot axis 22 of the lever 20 than the pivot connection 32 for the link 31 of the toggle joint 30—31. Thus it will be apparent that when the force of movement of the pedal lever 20 is carried directly through the toggle joint 30, 31 the mechanical advantage of the pedal lever 20 will be much greater than when the movement is carried through the toggle joint 50—51.

Figure 3:
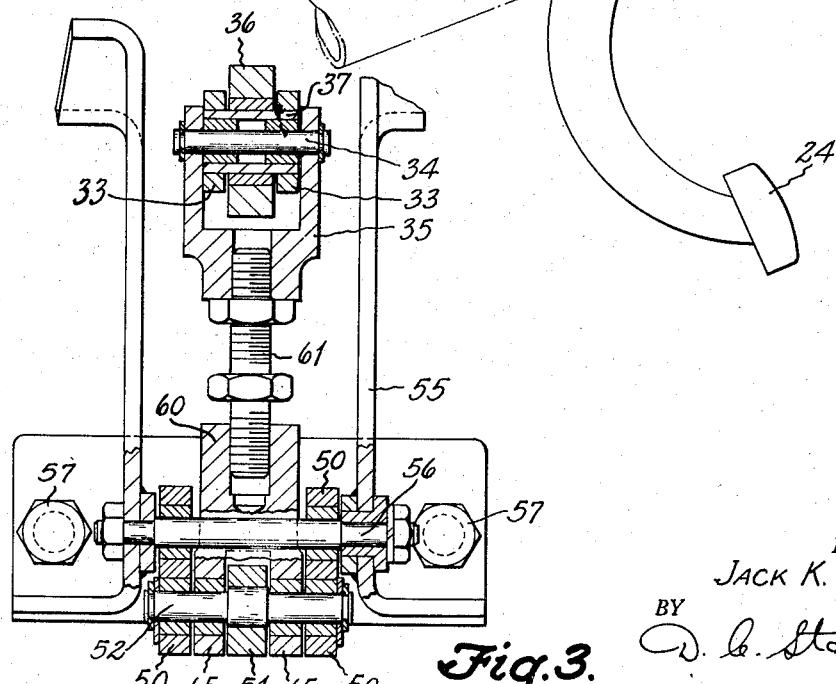
Figure 3 is a cross sectional view of the lever mechanism taken along line 3—3 of Figure 1.

The member 60 has its lower end formed as a yoke 65, as shown in Fig. 3 that straddles the link 51, the link 50 actually being composed of two link members placed on opposite sides of the yoke 65 and connecting between the knee pivot 52 and the fixed pivot 56 that is carried in the bracket 55, all more specifically shown in Figure 3.

The parts of the lower lever system assume the position shown in Figure 1 when the brakes of the vehicle are in retracted condition. When the brakes 16 are to be applied, movement of the pedal lever 20 in a clockwise direction about its pivot 22 first causes the knee joint 50—51 to move the link 50 of this knee mechanism clockwise about the fixed pivot 56 so that the knee pivot 52 will rotate about the fixed pivot 56. This action of the knee joint 50—51 causes the connecting link 60, 61, 35 to move in an upward direction. While the pedal lever 20 is moving clockwise about its pivot 22 and while the knee joint 50—51 is effecting the aforedescribed motion, the toggle joint 30—31 is being shifted from its disaligned position as shown in Figure 1 to its aligned position shown in Figure 2.

Figure 2:
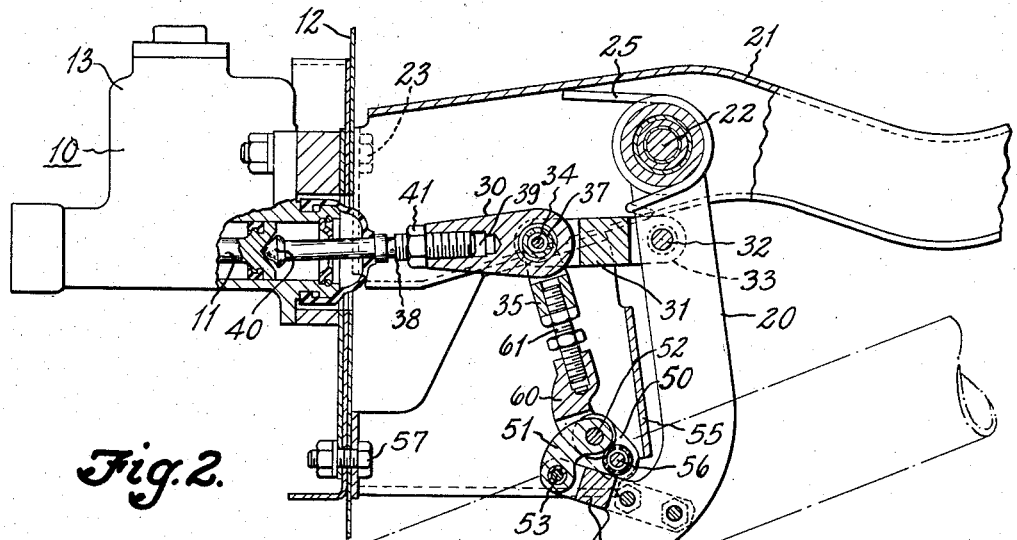
Figure 2 is a view similar to Figure 1 but illustrating the lever system in a brake applying position.

During the interval of movement of the lever 20 sufficient to cause the toggle mechanism 30—31 to move from the disaligned position of Figure 1 to the aligned position of Fig. 2, the rate of movement of the displacement member 11 of the master cylinder will be greater than the movement of the lever 20 because the movement of the lever 20 is having added to it the movement effected by alignment of the toggle joint 30—31 from its position of Figure 1 to its position of Figure 2.

Since this movement of the displacement member 11 is that which is provided to effect movement of the brake assemblages into engagement with their cooperating brake drums, the movement can be occasioned under a relatively low mechanical advantage and still obtain a low pedal pressure since the forces involved in moving the brake assemblages into engagement with the brake drums are relatively low. However, the movement of the displacement member 11 is effected rapidly so that only a relatively short movement of the pedal lever 20 effects a relatively large and rapid movement of the fluid displacement member 11 to take up the slack in the brake assemblage as quickly as possible.

As the pedal lever 20 moves from the position of Fig. 1 to the position illustrated in Fig. 2, link 50 rotates clockwise about the pivot 56 as urged by the link 51 to a point determined by clockwise rotation of link 51 about pivot 53 as illustrated in Fig. 2. This position of the links is controlled by the relative lengths of links 50, 51 and 54. After the extreme clockwise rotation of link 50 has been reached, it backs up, in a counter-clockwise manner tending to align pivots 53, 52 and 56. Thus the overall motion of the point at pin 34 is a rapidly damped oscillation about a straight line drawn from pivot 32 through a point at the center of piston 11. By careful control of the link lengths, this "oscillation" is used to obtain a more constant slope to the overall force-displacement curve, once the shift in mechanical advantage has been attained. At this time the force of the lever 20 is carried directly through the now aligned toggle linkage 30—31 with the result that a high mechanical advantage is provided with the result that low pedal pressure is required to effect further movement of the displacement member 11 for effecting brake application.

While the form of embodiment of the invention as herein disclosed constitutes a preferred form, it is to be understood that other forms might be adopted as may come within the scope of the claims which follow.

What is claimed is as follows:

1. A power applying lever system effecting a high rate of movement of a force applying lever during an initial portion of a power applying stroke with an increase of mechanical advantage effected during a subsequent portion of the power stroke, comprising, a force applying lever, means pivotally mounting said lever at one end thereof, a member to which force is applied, a toggle joint connecting said member and said lever and having a knee, a knee joint having one link carried by a fixed pivot and the opposite link connected to said applying lever, and a connecting link between the knees of said joints to effect actuation of said first joint by actuation of said second joint on movement of said applying lever about its pivot.

2. A power applying lever system effecting a high rate of movement of a force applying lever during an initial portion of a power applying stroke with an increase of mechanical advantage effected during a subsequent portion of the power stroke, comprising, a force applying lever, means pivotally mounting said lever at one end thereof, a member to which force is applied, a toggle joint connecting said member and said lever and having a knee, said toggle joint being normally disaligned with the force applying lever in normal non-force applying position, a knee joint having one link carried by a fixed pivot and the opposite link connected to said applying lever, and a connecting link between the knees of said joints to effect actuation of said toggle joint toward aligned position by actuation of said knee joint to effect movement of the member to which force is applied at a greater rate than movement of said force applying lever until said toggle joint is aligned whereat the member to which force is applied and the force applying lever move at substantially the same rate.

3. A power applying lever system effecting a high rate of movement of a force applying lever during an initial portion of a power applying stroke with an increase of mechanical advantage effected during a subsequent portion of the power stroke, comprising, a force applying lever, means pivotally mounting said lever at one end thereof, a member to which force is applied, a toggle joint connecting said member and said lever and having a knee and connecting with said lever adjacent the pivot thereof, a knee joint having one link carried by a fixed pivot and the opposite link connected to said lever at a point more remote from the pivot means for said lever then the connection of said toggle joint with said lever, a connecting link between the knees of said joints to effect actuation of said toggle joint by actuation of said knee joint on movement of said lever about its pivot with transfer of movement of said lever to the member to which force is applied from said knee joint to said toggle joint with simultaneous increase in mechanical advantage between said lever and the member to which force is applied.

4. A power applying lever system effecting a high rate of movement of a force applying lever during an initial portion of a power applying stroke with an increase of mechanical advantage effected during a subsequent portion of the power stroke, comprising, a force applying lever, means pivotally mounting said lever at one end thereof, a member to which force is applied, a toggle joint having a knee connecting said member and said lever with the connection of said joint with said lever adjacent the pivot for the lever and with the toggle joint in normal disaligned position with the lever in non-force applying position, a knee joint having one link carried by a fixed pivot and the opposite end connected to said lever at a point more remote from the pivot for said lever than the connection of said toggle joint with said lever, said knee joint being normally in disaligned position with said lever in non-force applying position, and a connecting link between the knees of said joints to effect movement of said toggle joint toward aligned position by rotation of the knee of said knee joint about the said fixed pivot to effect movement of the member to which force is applied at a greater rate than the movement of said lever until said toggle joint is aligned whereat the movement of said member to which force is applied is the same as that of said lever.

5. A power applying lever system effecting a high rate of movement of a force applying lever during an initial portion of a power applying stroke with an increase of mechanical advantage effected during a subsequent portion of the power stroke, comprising, a force applying lever, means pivotally mounting said lever at one end thereof, a member to which force is applied, a toggle joint having a knee connecting said member and said lever with the connection of said joint with said lever adjacent the pivot for the lever and with the toggle joint in normal disaligned position with the lever in non-force applying position, knee joint having one link carried by a fixed pivot and the opposite link connected to said lever at a point more remote from the pivot for said lever than the connection of said toggle joint with said lever, said knee joint being normally in disaligned position with said lever in non-force applying position, and a connecting link between the knees of said joints to effect movement of said toggle joint toward aligned position by rotation of the knee of said knee joint about the said fixed pivot to effect concurrently an increase in mechanical advantage between the lever and the member to which force is applied and a reduction in the rate of travel of the said member.

6. A power applying lever system effecting a high rate of movement of a force applying lever during an initial portion of a power applying stroke with an increase of mechanical advantage effected during a subsequent portion of the power stroke, comprising, a force applying lever, means pivotally mounting said lever at one end thereof, a power applying member, a link connecting said member with said lever and forming with said member a toggle joint having a knee disposed normally in disaligned position with the lever in non-force applying position, a knee joint having one link carried on a fixed pivot and the opposite link connected to said lever at a point remote from the connection of said link with said lever, said knee joint being normally in disaligned position with the knee thereof rotatable about the fixed pivot on movement of said lever about its pivot, and a connecting link between the knees of said joints for movement of said toggle joint toward aligned position on rotation of the knee of said knee joint about the fixed pivot with resultant concurrent increase of mechanical advantage between said lever and the said power applying member and reduction in rate of movement of the power applying member.

7. A brake applying lever system to effect a high rate of movement to the fluid displacement member of a master cylinder during initial movement of the brake lever with a gradually increasing mechanical advantage between the brake lever and the master cylinder after predetermined travel of the brake lever, said system comprising, a lever having a brake pedal on the one end thereof, means pivotally mounting said lever at the opposite end on a bracket, a master cylinder having a fluid displacement member, a pair of links connecting said displacement member and said arm forming a toggle joint having a knee, said toggle joint being normally in disaligned position with said lever in non-force applying position, a second pair of links forming a knee joint, means pivotally mounting one of said links on a bracket, means pivotally connecting the other of said links to said lever at a point more remote from the pivot of said lever than the connection of said first links with said lever, said knee joint being arranged to provide for rotation of the knee about the bracket mounted pivot for the same movement of said lever about its pivot, and a connecting link between the knees of said joints to move the toggle joint toward aligned position on movement of said knee joint by said lever to effect thereby movement of said fluid displacement member at a greater rate of movement than said lever until said toggle joint is in aligned position whereat the fluid displacement member is moved at the same rate of movement as said lever with an increase of mechanical advantage between said lever and said displacement member.

References Cited in the file of this patent
UNITED STATES PATENTS

| | | |
|---|---|---|
| 1,715,115 | Beede | May 28, 1929 |
| 2,179,503 | Hartbauer | Nov. 14, 1939 |
| 2,706,020 | Freers et al. | Apr. 12, 1955 |
| 2,755,891 | Levell et al. | July 24, 1956 |
| 2,779,563 | Spence | Jan. 29, 1957 |